Jan. 9, 1940.    H. KUPPENBENDER    2,186,545
SCHOOLING DEVICE FOR AIRPLANE PILOTS
Filed Jan. 28, 1938    14 Sheets-Sheet 1

Inventor
Heinz Küppenbender
By
B. Singer and F. Stern
Attys.

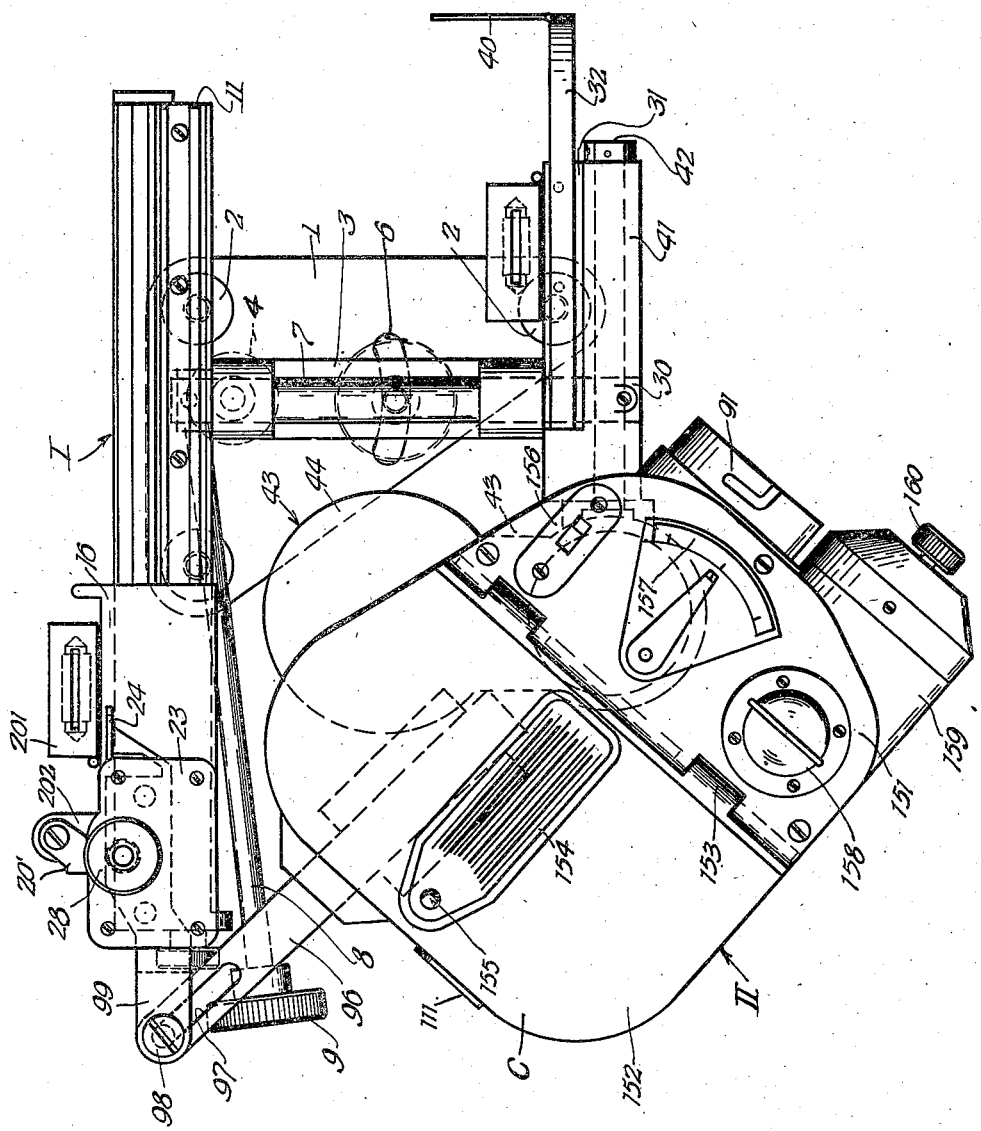

Jan. 9, 1940.   H. KUPPENBENDER   2,186,545
SCHOOLING DEVICE FOR AIRPLANE PILOTS
Filed Jan. 28, 1938    14 Sheets-Sheet 3
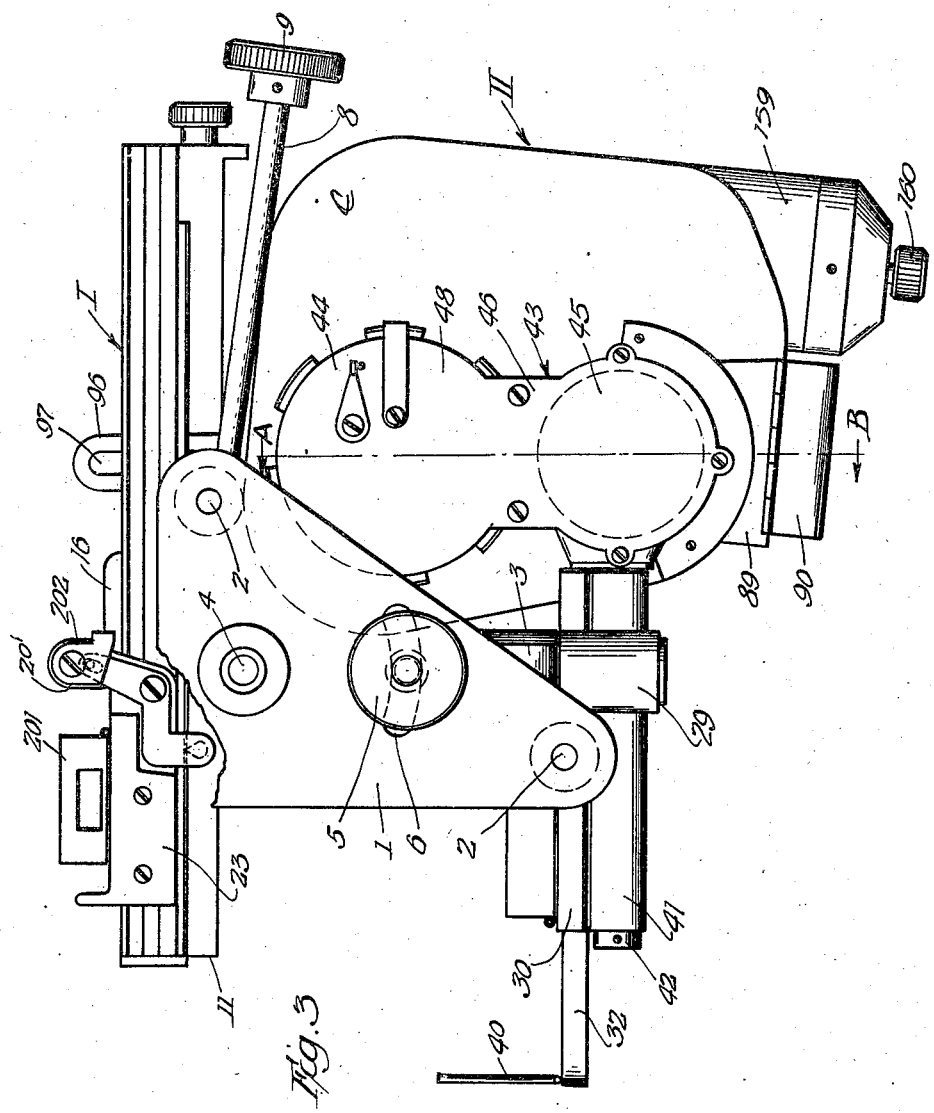
Inventor
Heinz Küppenbender
BY: Blinger and F. Stern Attys.

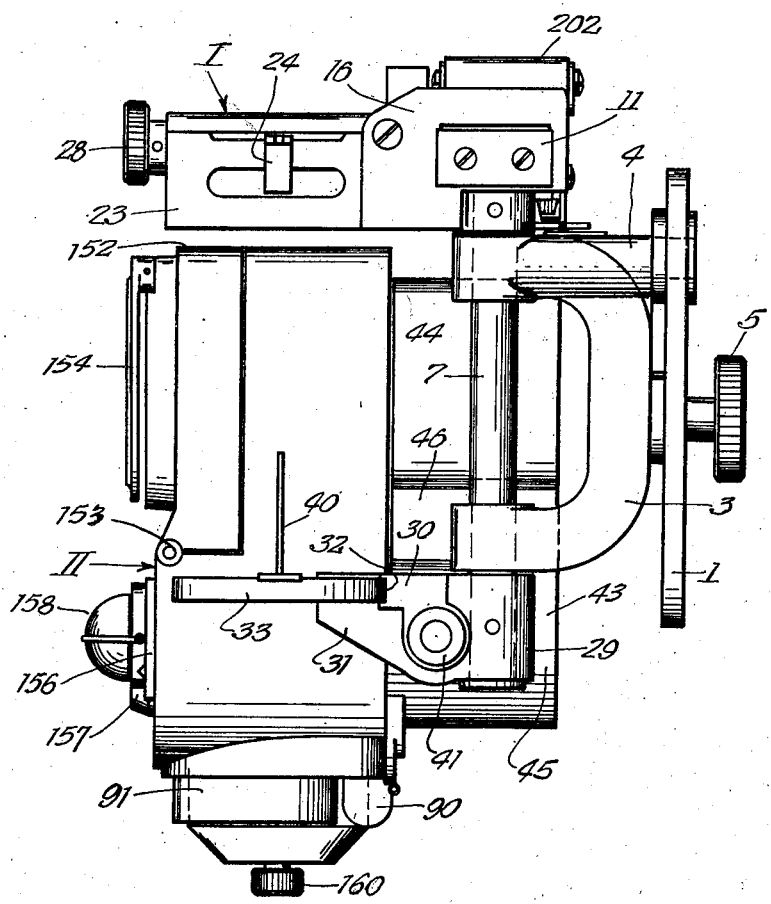

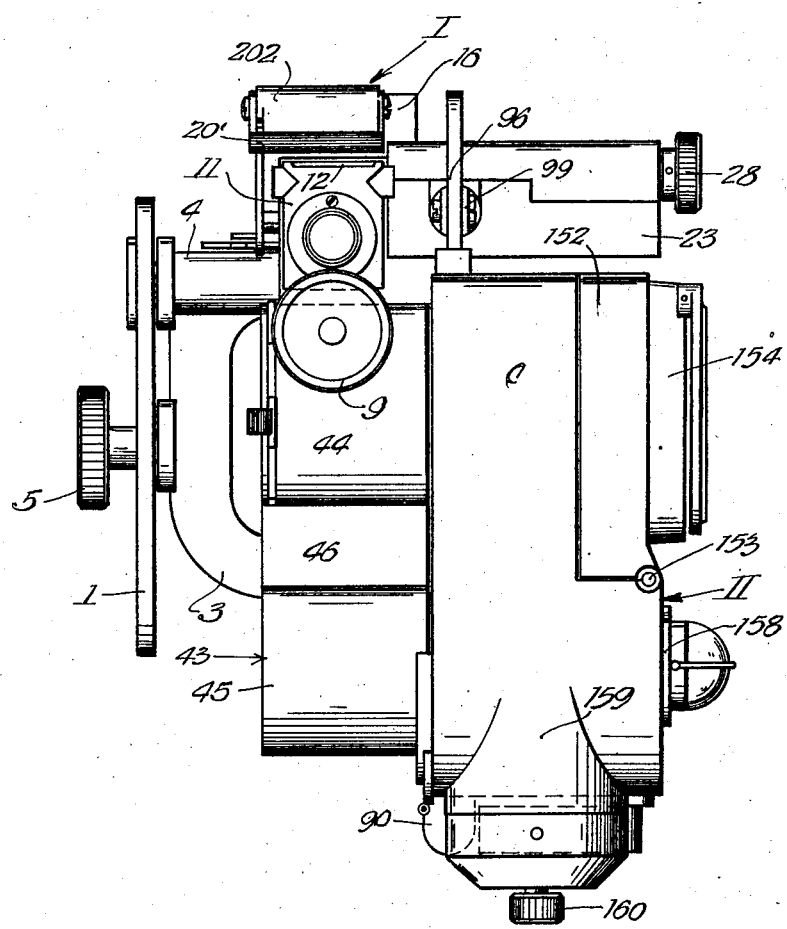

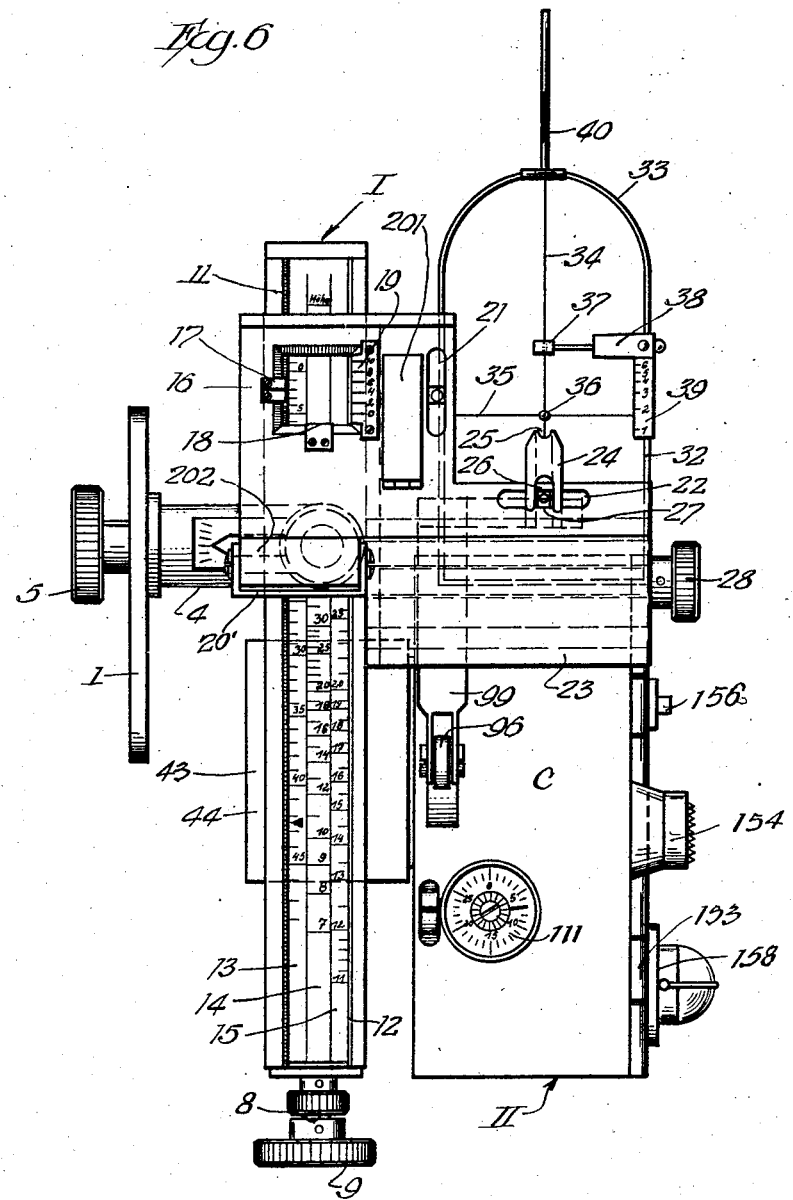

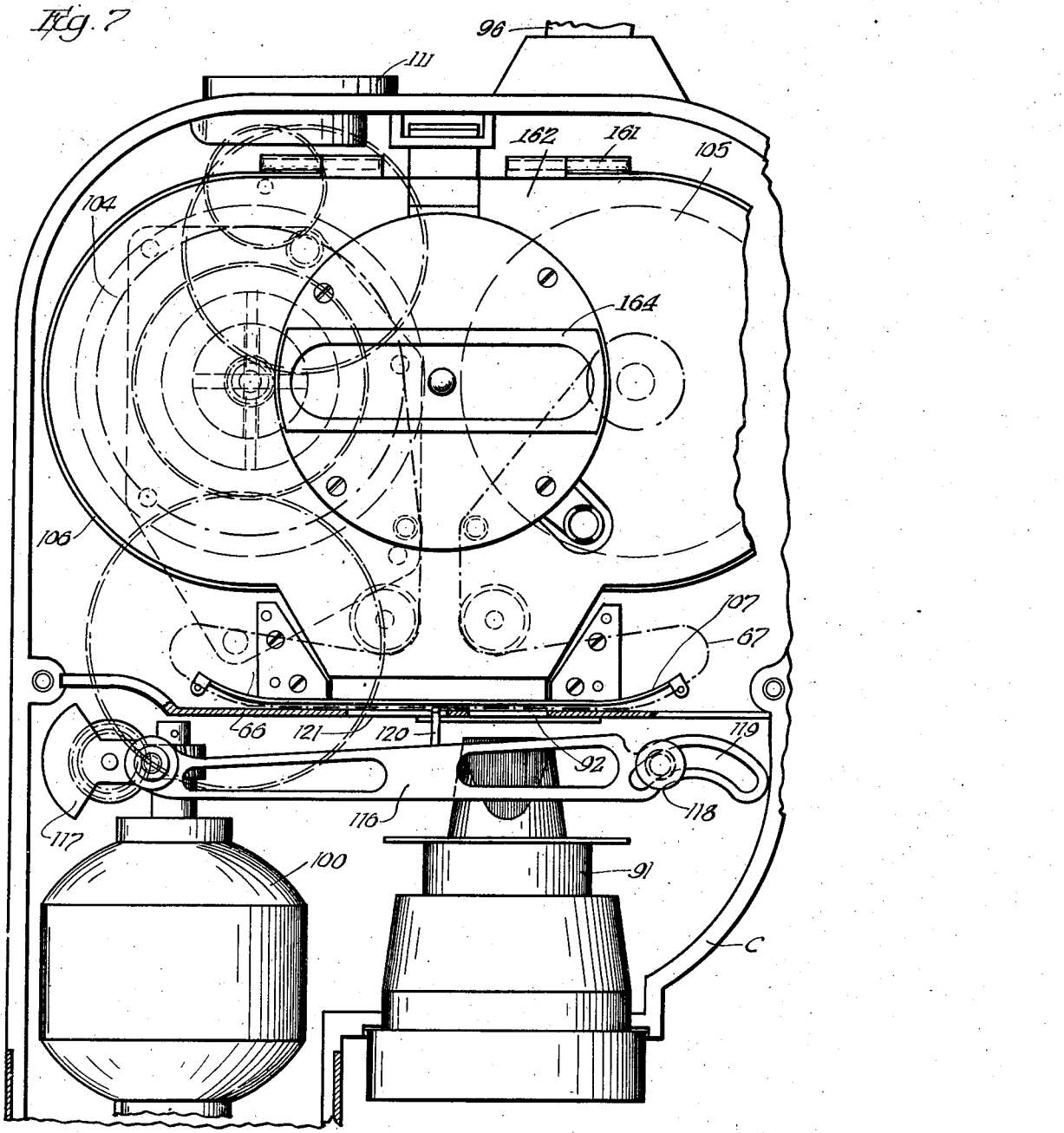

Jan. 9, 1940. H. KUPPENBENDER 2,186,545
SCHOOLING DEVICE FOR AIRPLANE PILOTS
Filed Jan. 28, 1938 14 Sheets-Sheet 8
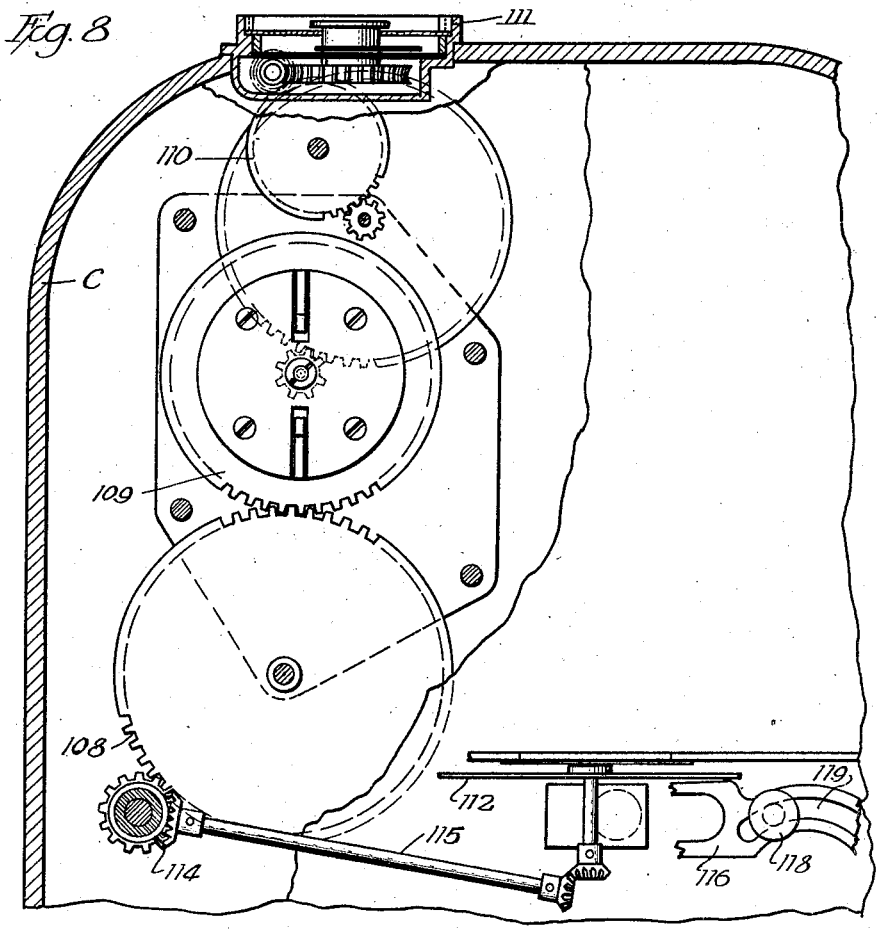
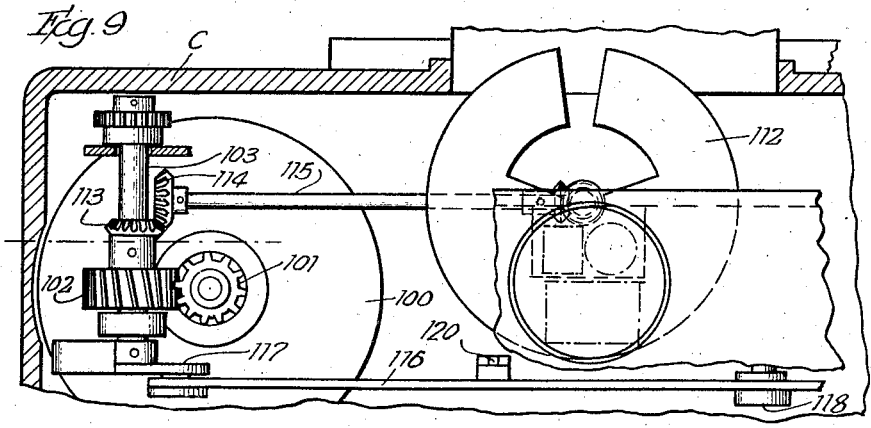
Inventor:
Heinz Küppenbender
by Blinger and F. Stern Attys.

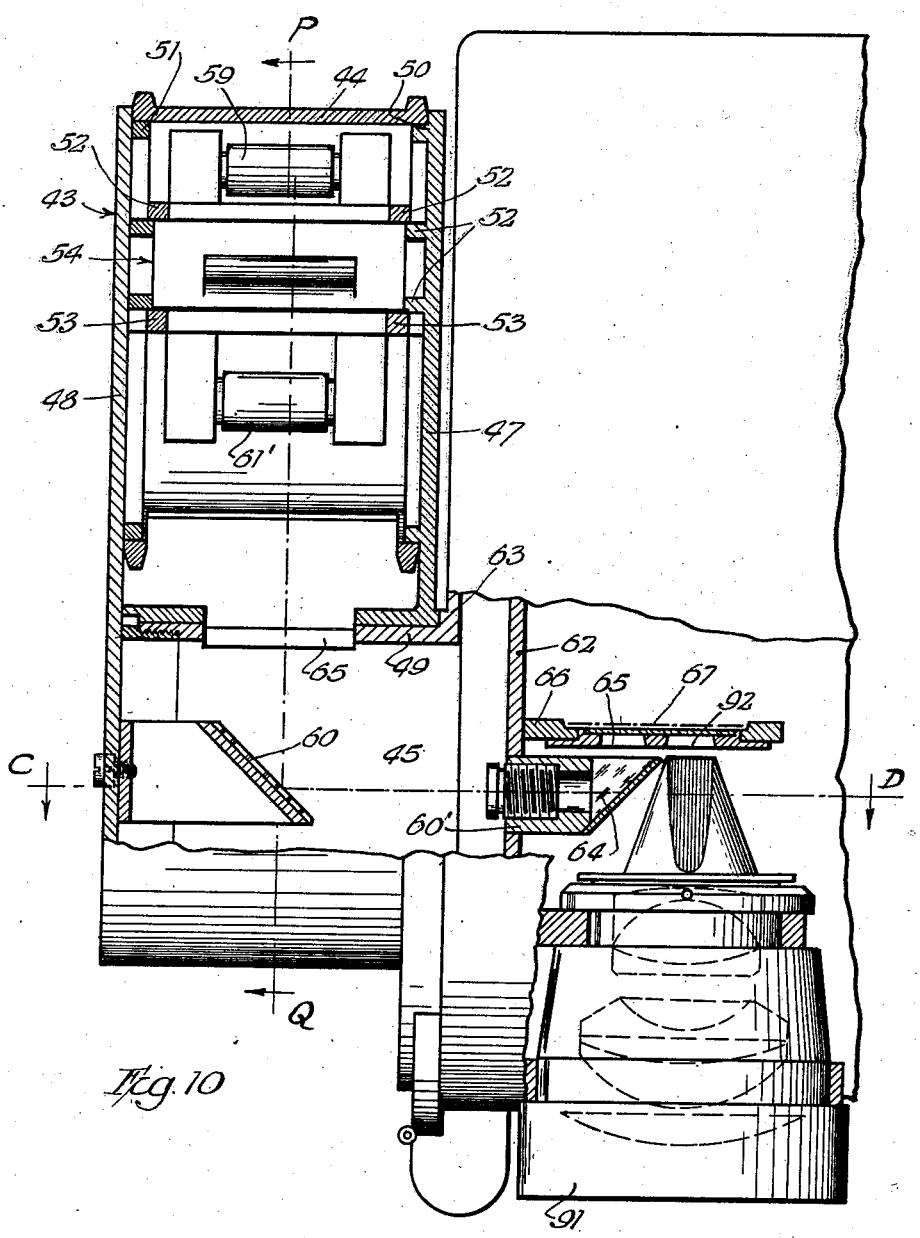

Jan. 9, 1940.  H. KUPPENBENDER  2,186,545
SCHOOLING DEVICE FOR AIRPLANE PILOTS
Filed Jan. 28, 1938   14 Sheets-Sheet 10
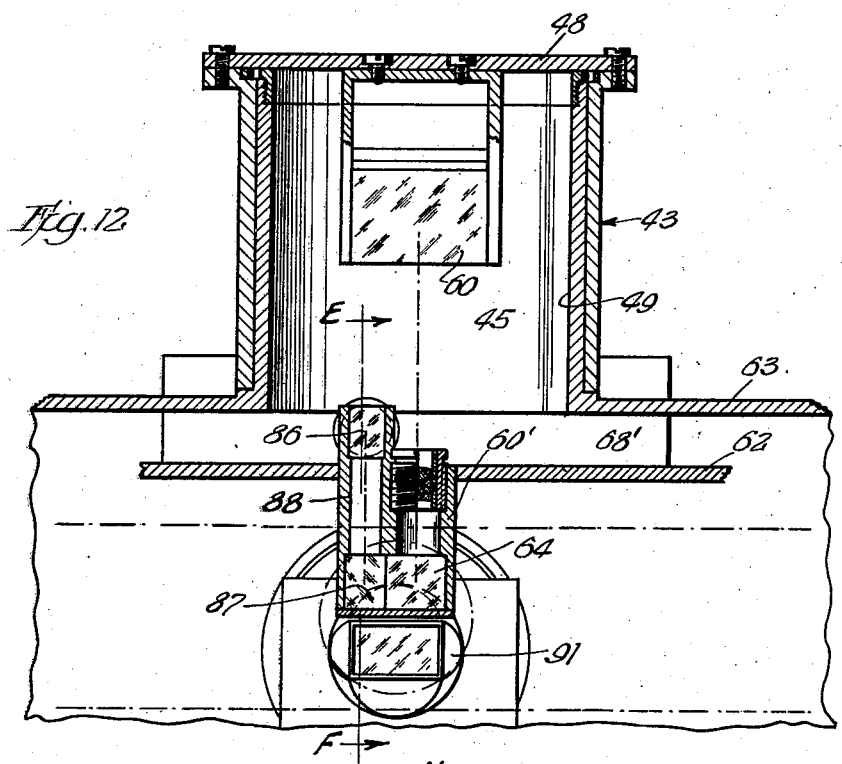
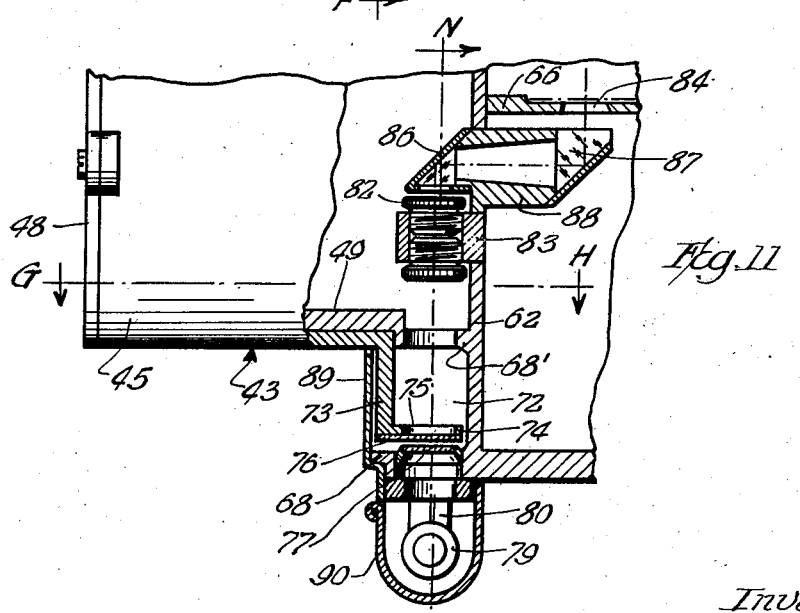
Inventor:
Heinz Küppenbender
BY
Bhinger and J. Stern  attys Jan. 9, 1940.   H. KUPPENBENDER   2,186,545
SCHOOLING DEVICE FOR AIRPLANE PILOTS
Filed Jan. 28, 1938   14 Sheets-Sheet 12
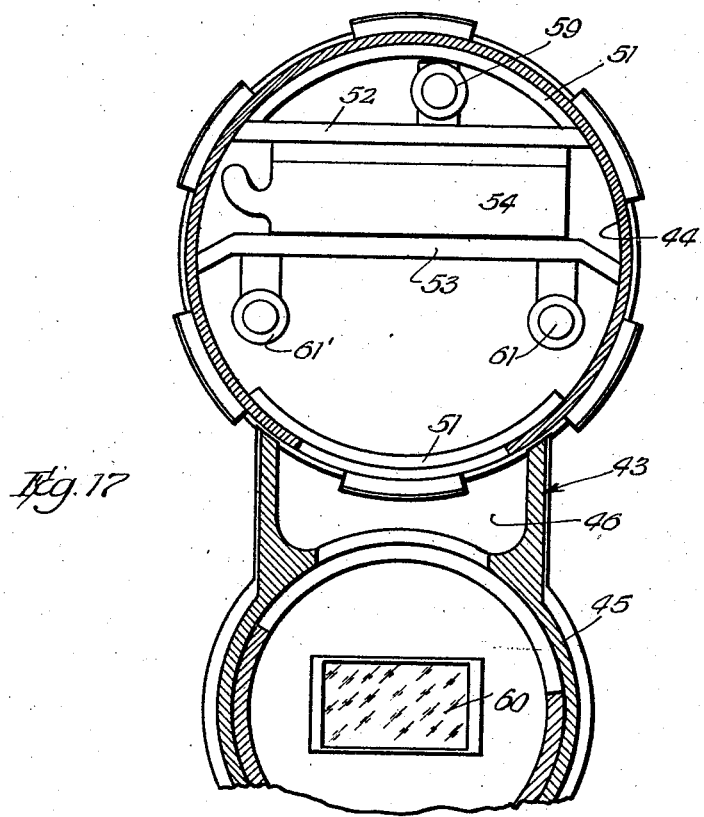
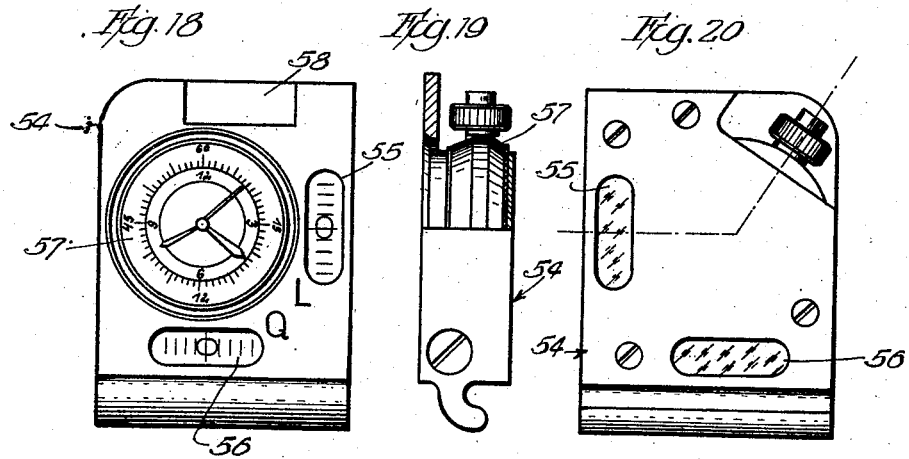
Inventor
Heinz Küppenbender
By
B. Singer and F. Stern Attys.

Jan. 9, 1940.  H. KUPPENBENDER  2,186,545
SCHOOLING DEVICE FOR AIRPLANE PILOTS
Filed Jan. 28, 1938  14 Sheets-Sheet 13

Inventor
Heinz Küppenbender
BY
B. Linger and F. Stern Attys.

Patented Jan. 9, 1940

2,186,545

UNITED STATES PATENT OFFICE 2,186,545

SCHOOLING DEVICE FOR AIRPLANE PILOTS

Heinz Kuppenbender, Dresden, Germany, assignor to Zeiss Ikon Aktiengesellschaft, Dresden, Germany Application January 28, 1938, Serial No. 187,535

32 Claims. (Cl. 35—12)

This invention relates to a schooling device for testing the skill of flyers who are to release bombs from the aerial vehicle in which they travel.

It is an object of the invention to provide a device of the character described in which photographic records are produced of indicia related to the factors which determine the path of a projectile dropped from a vehicle traveling at variable but predetermined speed and at a variable but likewise predetermined altitude above the ground.

It is, furthermore, an object of the invention to provide a device of the character described in which the operator has at his disposal means for determining the speed of the vehicle by utilizing the indications furnished by an instrument which shows its altitude and by selecting for the determination of the speed an auxiliary target or object on the ground itself.

Another object of the invention is to provide a device of the character described in which the photographic record is produced from replicas of those instruments which are directly under the control of the operator while the replicas themselves are not accessible to the operator but are automatically altered when the instruments accessible and visible to the operator are altered in their relation to each other. It is, furthermore, an object of the invention to provide in a device of the character described, in association with an aerial camera adapted to produce a series of pictures, a connection between this camera and those elements of the instrument under the operator's control which determine the line of vision to the object selected by the operator. In this manner the operator upon setting the instrument to enable him to aim at a selected object automatically also moves the camera to a position in which series of pictures of the selected object are produced together with series of pictures showing the setting of the instruments accessible to the operator.

Another object of the invention is to provide in a device of the character described, a camera adapted to produce series of pictures of objects and to combine with this record producing camera elements through which a series of pictures showing selected objects may be distinguished from a series of pictures showing approximately the same object, whereby the observer of the photographic record will be enabled to check by means of these records whether the primary or test flight for determining the speed of the vehicle was carried out properly and will also be enabled to check whether the approach flight on the object to be bombed was carried out in accordance with the settings which should have been made as a result of the test flight.

The invention, furthermore, has the object of providing in a device of the character described, means for facilitating the movement of various elements accessible to and actuatable by, the operator, in such manner that any alteration of this setting from the setting required for the test flight to the setting required for the approach flight to the object to be bombed can be carried out without any difficulties and with the least possible loss of time.

With these and numerous other objects in view, which will become apparent from a perusal of the following specification, the invention will be described below under reference to one specific example illustrated in the drawings.

In the accompanying drawings:

Fig. 2 shows the instrument from the same side, with the camera and the sighting device properly adjusted for practice operations;

Fig. 3 is a side elevation from the opposite side;

Fig. 4 is a front elevation;

Fig. 5 is a rear elevation;

Figure 13:
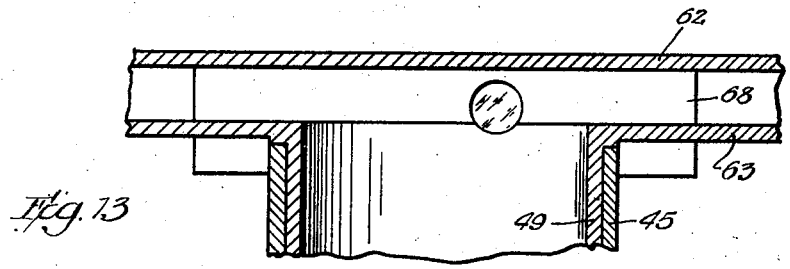
Figure 14:
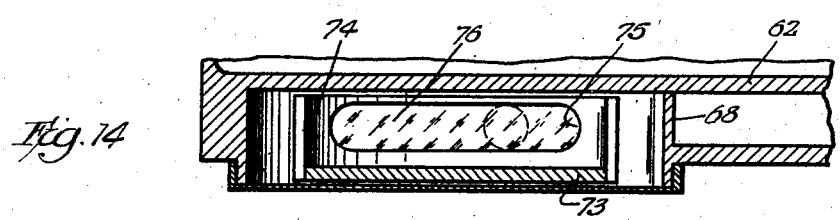
Figure 15:
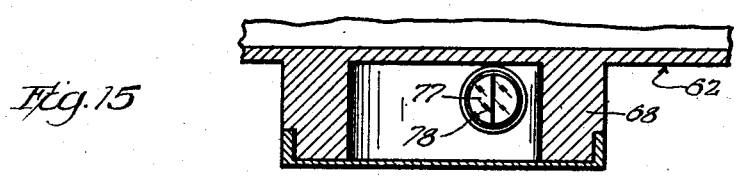
Figure 16:
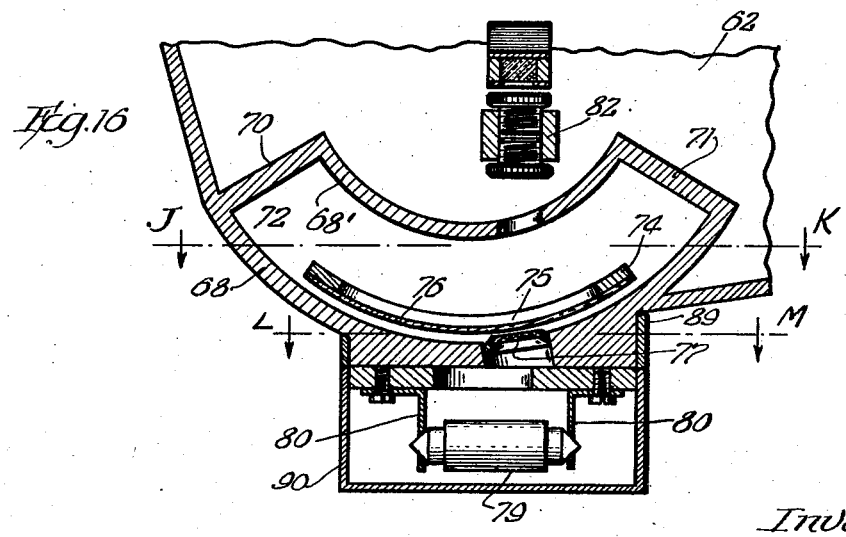
Figure 21:
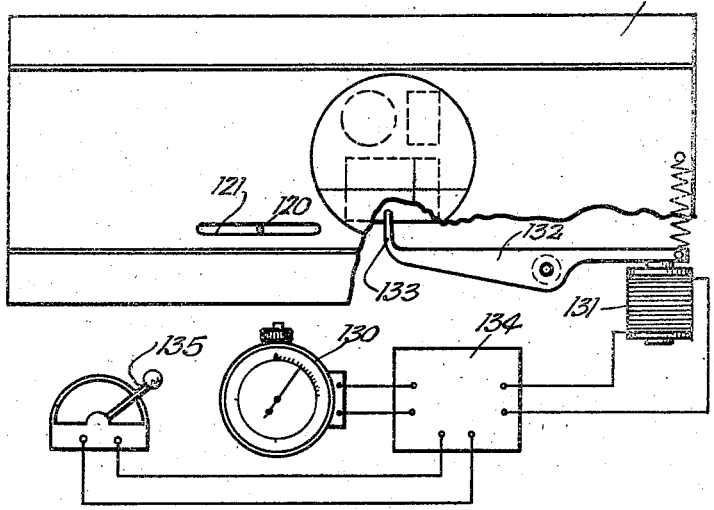
Figure 23:
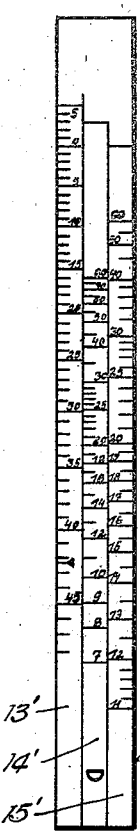
Figure 22:
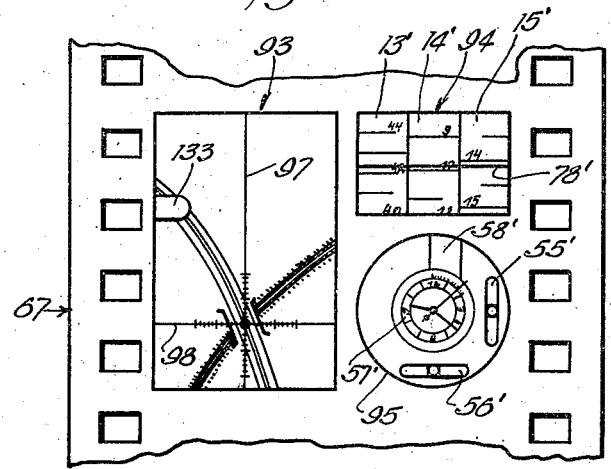
Figure 24:
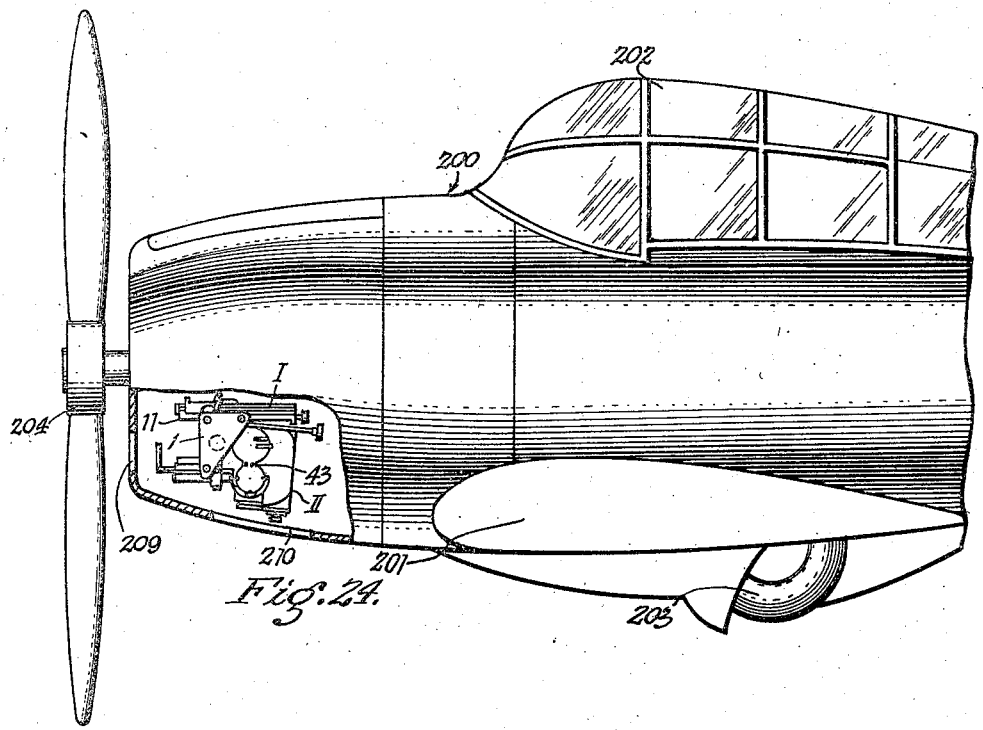
Figure 25:
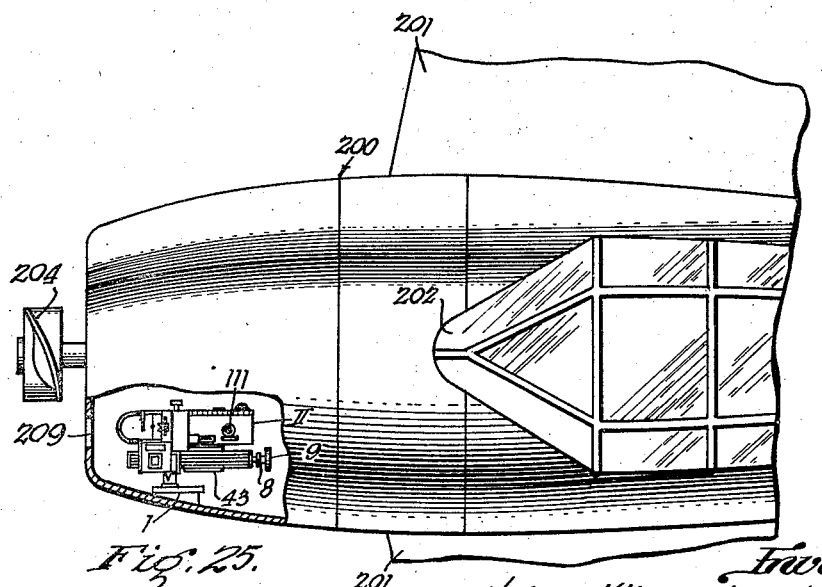

Fig. 6 a top plan view;

Fig. 7 shows diagrammatically the motion picture camera in side elevation, and film advancing mechanism of the same;

Fig. 8 is a fragmentary side elevation and partly section of the film feeding mechanism;

Fig. 9 shows in transverse sectional view additional details of the camera mechanism;

Fig. 10 is a section on line A—B of Fig. 3, and partly rear elevation of a connector housing between sight carrier and camera;

Fig. 11 is partly a section on line E—F of Fig. 12, and partly elevation of parts shown in Fig. 10;

Fig. 12 is a transverse section on line C—D of Fig. 10, through the connector housing;

Fig. 13 is a section on line G—H of Fig. 11;

Fig. 14 is a section on line J—K of Fig. 16;

Fig. 15 is a section on line L—M of Fig. 16;

Fig. 16 is a section on line N—O of Fig. 11;

Fig. 17 is a section on line P—Q of Fig. 10, through the connector housing;

Fig. 18 is top plan view on an assembly of elements in position to be photographed;

Fig. 19 is a side elevation of the assembly of elements shown in Fig. 18;

Fig. 20 is a rear elevation of said assembly;

Fig. 21 shows diagrammatically the electric control mechanisms for another element to be photographed;

Fig. 22 illustrates a portion of the film produced by the camera on an enlarged scale;

Fig. 23 shows a multiple scale carrier forming a part of the instrument;

Fig. 24 is a fragmentary side elevation and partly section of an airplane on which the device is shown mounted; and Fig. 25 is a diagrammatic top plan view and partly section of the airplane and the device mounted thereon.

The device comprises two principal self-contained units, namely, the sighting device proper or instrument unit indicated at I, and the motion picture camera or recording unit, indicated at II. The sighting unit is utilized for carrying out the operation of taking aim at selectively determined objects, and for making observations necessary for a test flight and the bombing flight, while the camera unit furnishes a photographic record of said sighting unit.

The device is mounted on a base plate 1 by means of which it may be vertically secured preferably in a fore and aft plane to the outboard framework or wall of the aerial vehicle (not shown). This plate, therefore, may be considered a part of the airplane or the like on which the device is secured. The base plate 1 is of approximately triangular shape and may be attached by means of attachment bolts (not shown), passing through holes 2 adjacent the three corners of the triangle. The assembly of instruments forming the instrument unit is mounted on the base plate 1 by means of a bracket 3 provided with an arm 4 projecting horizontally from the base plate. This arm 4 is rotatable in the base plate 1, whereby the entire assembly also may be rocked about the axis of the arm and may be held in the adjusted angular position by a clamping screw 5, Figs. 3, 4 and 6. The clamping screw 5 extends through an arcuate slot 6 in the base plate 1 and is connected with a bail-shaped portion of the bracket 3 which forms a pivotally adjustable supporting structure of several parts of the device, the center of the arcuate slot 6 obviously being located in the axis of the pivot arm 4.

The rotatable bracket 3 carries rotatably a shaft 7 whose axis is at right angle to that of arm 4, and is shown to intersect the same. The arm 4 may be termed the transverse horizontal adjusting shaft, while shaft 7 serves for vertical pivotal adjustment. The vertical shaft 7 projects upward beyond bracket 3 and carries in the projecting part the end of a rod 8 terminating in a knob 9 at the free end. By swinging this rod sideways with respect to the board or plate 1, the shaft 7 can be turned about its axis and lateral angular adjustment of the parts carried thereby may readily be effected. Adjustment of this character may be resorted to to compensate for lateral drift of wind-pressure. In this manner the entire device is mounted for universal movement on the base plate.

The vertical shaft 7 of the supporting bracket 3 may serve for mounting the sighting assembly I. The sighting unit comprises a longitudinal frame or beam 11, Figs. 1 to 4, on which a plate 12 of a set of scales is removably supported. This plate 12 is exchangeable to permit the rapid attachment of different plates, which are calibrated with reference to the type of vehicle on which they are to be used. Of the three scales 13, 14 and 15 positioned on the plate 12, the scale 13 is used for indicating the angular elevation to which the sighting device is set to permit the flyer to sight at a selected object for the purpose of determining the speed of the vehicle. The scale 14 is the scale on which the altitude of the aerial vehicle is indicated. Scale 15 is calibrated to show time intervals determined by stop watches for certain operations. The three scales are shown to be in fixed relation to each other.

The frame 11 on which the scale carrying plate 12 is removably supported also is associated with a carriage 16 for indicators cooperating with the scales 13, 14, 15. This carriage slidable longitudinally on the frame 11 and plate 12, also is equipped with a locking device 20'. The locking device preferably is gravity actuated as indicated in Fig. 3, but the details of this device are unessential for the present description. It is of such structure that it automatically holds the carriage 16 in any adjusted position on the frame 11 until it is manually released by the operator. The indicators or marks on carriage 16 cooperating with the scales 13, 14 and 15 are shown at 17, 18 and 19, respectively. As shown in Fig. 6, the indicators are horizontally offset from each other. But as the scales are in fixed relation to each other, and the scale values are relative values only, these scales might be arranged in such manner that horizontally alined indicators 13, 14, 15 might be applied to the same.

The carriage 16, furthermore, is provided with a liquid level 21 of the bubble type, mounted longitudinally of the device, and an additional liquid level 22 transversely disposed on a lateral projection 23 of carriage 16, as shown in Fig. 6. Small housings 201, 202 are mounted on the carriage so as to be movable with the same, and contain lamps, the details of which are not shown, to illuminate the bubble levels and the indications on the scales.

The lateral projection 23 of the carriage, furthermore, is equipped with the upper sight 16 consisting of a plate clip or angular element 24 having a shallow notch 25 at the tip and having a deeper bifurcation 26 at the rear end. A pin 27 entering between the prongs of the bifurcated portion 26 is adapted to be actuated by some gearing or other transmission (not shown) beneath the carriage through a manipulating screw 28, Fig. 6, whereby the pin 27 may be shifted laterally so as to set the sight 24 in respect of the transverse bubble level 22. When the device is horizontally positioned and the sight 24 properly adjusted, the bubble can be observed through the fork 26.

The vertical shaft 7 which is rotatable in the bracket 3 carries at its lower end a support 29 for the lower sight. This support comprises a tubular portion 30, from which a holding bracket 31 projects to support a frame 32, the front portion of which advisably is semi-circular as indicated at 33. Within this frame, a pair of intersecting threads 34, 35, are maintained in tensioned condition, the intersecting point 36 constituting the companion sight to the member 24 described above. The thread 34 of the cross formed by the intersecting threads is tensioned within the frame 32 in a direction indicating the direction of flight.

An auxiliary sight 37 is adjustable longitudinally of the thread 34 by means of a slide bracket 38 provided with an altitude scale 39 and connected with the frame 32. The function of this auxiliary sight 37 is to call the attention of the bomber to the fact that the operation of the camera may be started.

Figure 1:
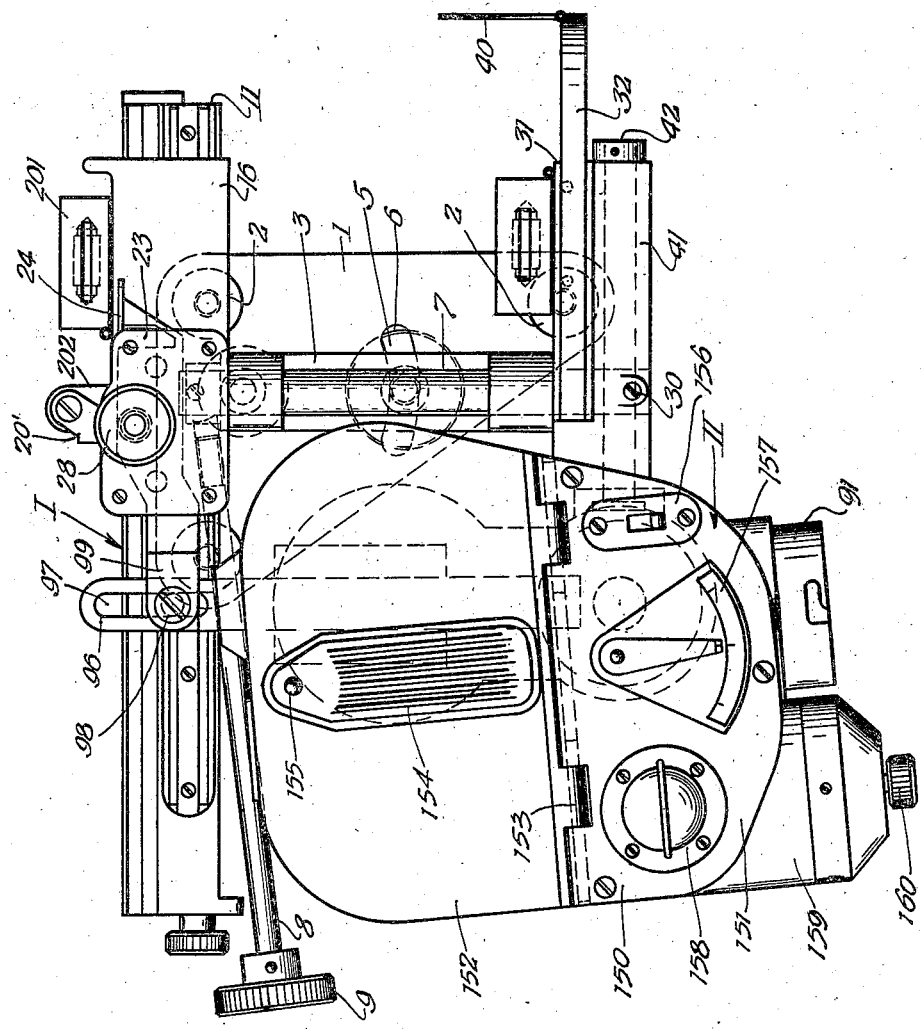
Fig. 1 is a side elevation of the instrument from the right hand side, shown in normal or neutral position.

Another auxiliary means for improving the function of this companion sight in indicating the direction of flight is formed by a member in alinement with the longitudinal sight thread 34. The frame 32 for this purpose is provided with a short rod 40 which may be tilted to vertical position, as shown in Fig. 1, or to horizontal position in alinement with the thread, as shown in Fig. 6.

The bracket 29 at the foot of the vertical shaft 7 also supports a tubular sleeve 41 longitudinally disposed between the bearing 30 and the frame 32. This sleeve also serves as a bracket and at the same time constitutes a bearing for a supporting rod 42, the rear end whereof is rigidly united with a housing 43.

This housing, as shown in Figs. 3, 10 and 17, comprises an upper larger cylindrical compartment 44, a lower smaller approximately cylindrical compartment 45, and a short interposed box-shaped bridge portion 46, a rear wall 47, and a detachable front wall 48. This housing structure is, therefore, rigidly united with that assembly of elements which is carried by the bracket 6, including the scales, the sights, the levels and their adjusting means. It may be stated here that the lower cylindrical compartment forms a bearing for a projecting tubular trunnion 49 of the camera C, whereby the latter may be rotatably adjusted about the axis of this compartment. The housing 43, therefore, serves as a connecting means between the instrument unit I and the camera unit II, which units are rotatably adjustable relatively to each other. This housing serves to receive a plurality of indicating means, some of which are replicas of indicating means located outside the housing, and it is from these replicas that photographic records are made by the camera.

The upper compartment 44, which is reinforced by arcuate ribs 50, 51 at the end walls, also presents transverse bars 52, 53 arranged in parallel pairs, with the two pairs of bars vertically spaced, Figs. 10, 17 and traversing the cylindrical compartment. A box shaped carrier 54 is adapted to be slid in between and to be supported by these bars.

This box shaped carrier unites in a self-contained assembly replicas 55 and 56 of the indicating members 21, 22, namely the bubble levels on carriage 16. It also serves for supporting a watch 57, and a name plate 58, on which the name of the bomber may be inscribed. The openings for the level replicas extend through the body of this carrier, as indicated in Figs. 18 and 20. Since the housing structure 43 is in rigid relation to the beam or frame 7, the indications of the levels 21, 22, will appear duplicated on the levels 55, 56. The bars 52, 53 between which the carrier unit or support 54 for the levels 55, 56, the watch 57 and the name plate 58 is held within the chamber 44 are arranged to leave these elements accessible to illumination by the electric lamps 59, 60, 61, Figs. 10 and 17, within compartment 44. The settings of the levels 55, 56 corresponding accurately to the settings of the levels 21 and 22, are used as objects for photographic reproduction upon the film exposed in the camera. Similarly also the time indicated by watch 57 and the name plate 58 will be photographed.

In order to produce these pictures on the film in the camera, the lower compartment 45 contains a reflector 60, secured to the front wall 48. This reflector is positioned beneath the opening 65 in such manner, (Fig. 10) that it projects images of the watch 57, the name plate 58 and the level indications at 55, 56 towards a lens carried in the lens mounting 61 supported in a partition wall 62 of the camera. The end wall 63 of the camera is provided with that projecting tubular stud 49 which finds its bearing in the lower cylindrical compartment 45, and the reflector 60 as well as the lens mounting are in the axis of the stud to remain in operative relation upon any rotary relative displacement of housing structure 43 and camera C, Figs. 10, 12, about the axis of the tubular trunnion 49.

The lens supported in the mounting 61 is of such configuration or combination that it will reduce the size of the pictures reflected by the projector 60. The lens is also associated with a prismatic reflector 64, the reflecting face whereof projects this reduced picture of the elements disposed on the carrier 54 through an aperture 85 in a wall 66 of the camera C. As will be seen from Fig. 10, the aperture 65 is covered by a thin glass plate directly beneath the film 67. The reduced picture of the assembly of elements supported by the carrier 54, therefore, is reproduced on the film 67 upon exposure of the latter.

The aerial motion picture camera C shown by way of example may be of any desired construction. The device can be used in association with any type of aerial camera as long as it is supported for cooperation with the replicas, as described. In the embodiment illustrated in the drawings, the front wall 150 of the camera has a lower fixed wall plate 151 and an upper hingedly attached removable cover portion 152. The cover portion 152 may be swung to open position about the hinges 153 upon movement of a handle 154 on the outer face of the cover 152 about the latch pivot 155. The fixed plate 150 of the camera is shown to be provided with a switch 156 for closing the circuit through the motor 100, Fig. 7. This plate 151 also carries a regulator 153 for setting the speed at which the film is advanced, three speeds (frames of film per second) being available for selection. This plate also carries a closure member 158 which is removable to permit the insertion of a hand crank or the like, not shown, through the plate 151 for engagement with the gearing of the film feed mechanism if it is desired to drive temporarily the film feed mechanism by a crank or the like. These figures also show that the housing of the motion picture camera is provided with a downward extension 159 in which a portion of the motor 100 is supported. A knob 160 is associated with the shaft of the motor, for starting the motor manually in case it should be of the type requiring this manual starting movement, or for braking the motor.

All of these parts, however, are shown by way of example only, and do not form any part of the present invention.

As indicated in Figs. 11 to 16, the wall 62 of camera C is provided with an arcuate shelf 67, projecting towards the housing structure 43 adjacent the lower end of the wall. A similar arcuate shelf 68 projects in the same direction above shelf 67, and merges into the tubular trunnion 49, Fig. 11. Ribs 70, 71, Fig. 16, projecting from wall 62 outwardly and substantially radially at the ends of the shelves 67, 68 produce in this manner a chamber 72 which is open at the front, Fig. 11. An extension 73 of the wall 47 of cylindrical compartment 45 has at its lower edge an arcuate flange 74 with an elongated opening 75. A carrier 76 of transparent material for a set of scales which corresponds as to its relative graduations to the set of scales 13, 14 and 15, and which has arcuate shape is located in said opening to extend equidistantly from the shelves 67, 68, and is secured to the flange 74 of the housing structure 43.

A transparent disc 77 having a single indicating line 78, as shown in Fig. 15, is disposed beneath the scale carrier 76 in an opening of an enlargement of shelf 67. A lamp 79 mounted in brackets 80 on an insulating plate 81, Figs. 11 and 16, below the extension 67 illuminates the scale carrier 76 as well as the indicator disc 77, so that the picture of a group of graduations on carrier 76 and the marking line 78 is projected into a lens whose mounting 82 is supported in a stud 83 secured in the partition wall 62, Fig. 11. The picture is transmitted from this lens through the reflectors 86 and 87, both of which may be constructed as prisms located in a supporting bracket 88 in the partition wall 62. The second reflector 87 throws the image of the respective group of scale indications traversed by an image of marking line 78 through another opening 84 in the wall 66 of camera housing C.

From Figs. 3, 10, 11 and 14 to 16, it will be seen that the downward extension 73 of the cylindrical compartment 45 and the elements enclosed therein are protected by a removable cap 89 having a special hinged hood 90 for the lamp 79.

The ground above which the aerial vehicle flies may be photographed in a known way through the compound lens 91 which projects groundward from the housing of the camera C. The details of this lens mounting are not subject matter of this invention and may be similar to that of other aerial motion picture cameras. As shown in Figs. 10 and 12, the picture produced by lens 91 is projected through window 92 and through the thin glass plate onto the film 67.

Each "frame" of the film, therefore, may appear as shown in Fig. 22. This record presents in each frame a picture 93 of a portion of the ground over which the flight is made, a picture 94 of a group of graduations from scale carrier 76 and marking line 78, and a picture 95 of the elements assembled in carrier 54. The reference characters 13', 14', 15', 78', 55', 56', 57' and 58' of pictures 94 and 95 correspond to the elements which they represent.

The intersecting lines 97, 98 appearing in the picture 93 of the ground area, are produced by providing that portion of the glass plate which underlies the film at the point of the exposure, Fig. 10, with two intersecting lines which may be etched into the same or produced otherwise. Their rectangular relation, with one of these lines extending accurately in the direction of flight greatly assists in the orientation of the observer of the record with respect to the ground surface photographed at 93.

For the purpose of angularly setting the camera C in accordance with the elevation angle to which the two sights 25, 36 have been set by movement of the carriage 16, an assembly of elements may be used, as described in the following.

A bar 96, Figs. 1 and 2, projects upward from the camera housing and the top end of this bar is provided with an elongated slot 97 adapted to retain slidably a pin 98 which projects laterally from another bar 99 rigidly connected with the carriage 16. On this carriage the sight 24, the levels 21, 22, and the scale indicators 17, 18, 19 are mounted. When, therefore, the carriage 16 is shifted longitudinally from the position shown in Fig. 1 to the position shown in Fig. 2, a pivotal movement is transmitted to the camera C to rock the same about the axis of the lower or trunnion section 45 of housing 43, while housing 43 itself remains in unaltered relation to the vehicle. Owing to the mounting of the reflector 60 and lens 61 in the axis of this pivotal movement, Fig. 10, the projection of images of the elements assembled in the carrier 54 will not be interfered with.

The angular adjustment of the camera C causes the indicator disc 77, Figs. 15 and 16, to change its position relatively to the scale carrier 76 fixed in the stationary housing 43. The indicating line 78 will, therefore, appear transversely of the three scales on the scale carrier 76 corresponding to the setting of the carriage 12 and its indicators 17, 18, 19 with respect to the scales 13, 14 and 15 respectively on the scale support 12, which is exchangeably fixed to the longitudinal frame or beam 11.

In Fig. 6, the indicators 17, 18, 19 appear not in a straight transverse line, to facilitate the reading of the scale units by utilizing bevel edge marks in a known way. It is obvious, however, that by longitudinally shifting the scales 13, 14, 15 relatively to each other the values on these scales to which the indicator 17, 18, 19 are directed might be transversely alined. The replica of the scales 13, 14, 15 as displayed by the carrier 76 shows them in such position that a single transverse line will indicate the same values as the three, relatively immovable, indicators 17, 18, 19.

The film moving mechanism for the motion picture camera is represented by way of example in Figs. 7, 8 and 9. The housing of the camera is divided into an upper section for gearing and film reels, and a lower section for the motor and lens.

A motor 100 actuates by worm 101 and worm gear 102 the intermediary shaft 103 which controls the continuous film feed mechanism, the intermittent film advancing mechanism, and the shutter.

The film reels 104, 105 are mounted in a lightproof magazine or case 106, which can easily be removed from the camera or inserted to proper relationship with the film guide 107 and with the train of driving gears 108, 109, 110, Fig. 8. The latter also may drive a footage meter 111, a speed governor (not shown) and auxiliary mechanisms (not shown), as in other cameras. The shutter 112, shown in Figs. 8 and 9, may be of any desired suitable configuration and is shown here as a substantially circular slotted disc. It is actuated from shaft 103 by means of bevel gear transmissions 113, 114 and jack shaft 115. The gripper 116 is driven from shaft 103 through the counterweighted crank 117, while being guided for reciprocating and swinging movement by the pin 118 engaging the cam slot 119. One or more fingers 120 push the film in the desired direction through entry of these pins into the sprocket holes of the film, while projecting through slot 121 in the wall 66.

The film magazine 106 is maintained in position by a cover 161 which is hingedly supported in the interior of the housing at 162 and which subsequent to the insertion of the magazine will be held in position by the retaining device 164 diagrammatically indicated in Fig. 7.

Any other film actuating and shutter mechanism may be used in place of the elements described here by way of example only.

Since the use of the apparatus involves the production of two records containing similar pictures, means are provided for adding selectively to any group of pictures a distinctive record element. A mechanism controlled manually may for instance project a part between the lens and film whereby a representation of this projected part in the pictures of one group readily distinguishes them from those of another group.

A switch, here illustrated as a stop watch 130, Fig. 21, causes upon its release and while in operation current to flow through an electromagnet 131 which is thereby energized, and attracting the right hand end of its armature 132 projects the opposite end provided with a finger 133 into the field of the picture 93, Fig. 22. The finger 133 is movable in a plane below and close to the wall 66 over which the film travels. The picture of this finger remains visible in all of the pictures 93 successively taken by the aerial camera as long as the watch 130 is running. The watch obviously may be located within reach of the operator, and is connected with the electromagnet 131 through a connector block 134, to which also the leads from a battery or some other source of electric energy (not shown) are connected.

The release of the bomb from the aerial vehicle may be effected by manipulation of some element within reach of the operator, as for instance by the hand lever 135 diagrammatically shown in Fig. 21. The movement of this hand lever to release position for the bomb also may be used to energize the electromagnet 131, since conductors 136 extend from terminals adapted to be connected upon manipulation of the lever 135 to the battery block 134 from where they are continued to the electromagnet. The armature 132 will then also project the finger within the picture 93 of the territory of the flight. Upon withdrawal of the manipulating lever 135 from operative position, immediately following the release of a bomb, the picture of the finger again disappears from the picture 93.

After release of the bomb, the camera is again quickly manipulated by means of the carriage 16 to make a series of exposures of the point at which the bomb struck the ground. In this manner the hits also are photographically recorded.

The operation of the device may be described as follows:

In order to release a bomb to strike a selected object, an auxiliary test flight is made to determine certain factors. The ballistic curve of a projectile dropping from an airplane in flight depends on the speed of the plane and its height above ground. The height above ground may be determined through an altitude meter. The length of time consumed in flying over a selected test stretch enables the flyer to determine the speed of the vehicle with respect to the ground. For the purpose of making these ancillary determinations with accuracy, the flyer must first position the aerial vehicle in space so as to be horizontal—an operation which can be carried out upon observing the longitudinal and transverse bubble levels 21, 22. The flyer, furthermore, must turn the entire device about the vertical axis 7 if there should be air currents laterally acting on the aerial vehicle and having a tendency to shift it from the direction of flight. These adjustments having been made by the flyer, the plane of movement out of which the projectile is to be released, is determined as a plane parallel to the ground.

To determine the speed of the vehicle, the flyer now selects, without changing the direction of flight towards that object which is the target for the bomb, an auxiliary object. This auxiliary object should be close to the actual object, but it must be sufficiently remote from said last named object to permit the flyer to complete the manipulations necessary for the release of a bomb from its holder or cradle during that interval which elapses between the arrival over the auxiliary object and the arrival at that point at which the bomb for striking the actual object is to be released.

After having determined the altitude by means of a suitable instrument, (as for instance, a barometer) the operator shifts the carriage 16 to bring the indicator 18 to this altitude indication. This adjustment of carriage 16 to the determined altitude automatically brings about a certain relation of the upper sight 24, mounted on the carriage 16, to the lower sight 36, which does not move with the carriage 16. The elevation of the sights 24, 36 for the auxiliary object is now determined.

The flyer having selected this ancillary object or target as an end point of the test stretch, and having set the sights 24, 36 to the elevation conditioned by his altitude, now continues his flight in line toward the auxiliary object. When the auxiliary object enters the line of vision determined by sight 24 and secondary companion sight 37 the operator starts the camera. At the instant at which this auxiliary object selected by the flyer now becomes visible in the line of the sights 24, 36, the flyer releases a stop-watch, for instance stop-watch 130, to operation. Immediately after the start of this watch, the carriage 16 is returned to its normal position in which the two sights 24, 36 are in vertical alinement.

The sighting line previously at an oblique angle to the ground is now restored to vertical relation. While having his instrument in a position for vertical sighting, the flyer continues his flight in direction towards the auxiliary object, for which purpose he observes the direction indicating elements 34, 40 combined with the sight frame 33. If, now upon continuation of this test flight, the auxiliary object appears in the vertical line of the sights 24, 36, the flyer instantly stops the watch.

Since the altitude of the vehicle above ground is known, and the elevation of the sights furnished an angle of a rectangular triangle whose base is formed by the test stretch, the length of the latter can easily be computed, and hence also the speed of the vehicle traveling for the time indicated by the stop watch over this stretch.

The records completed during the test flight will show a number of pictures of the ground without the picture of finger 133, the pictures of the bubble levels 21, 22, made from their replicas 55, 56, the pictures of scale settings 78, 13', 14', 15' made from the replicas and the time. A series of pictures will show the finger 133, and the appearance of this finger in pictures 93 will coincide with a certain time indication. Its disappearance from pictures 93 and the corresponding picture of the time piece 57 indicate the elapsed time of the test flight.

The preliminary test having been finished, the flyer now proceeds to carry out the approach flight to the actual object in the same direction at the same altitude and at the same speed.

The time elapsed for the test flight and indicated between the start and stop of the watch is now the factor which determines the setting of the carriage 16. The carriage is set to this time value on scale 15, and as this scale has a fixed relation to the altitude scale 13, to which the elevation scale 14 also has a fixed relation, the sights 24, 36 are again brought to a different angle relatively to the ground. This angle is dependent on the speed of the airplane. The point at which the bomb will strike the ground depends on the ballistic curve path described by the bomb upon its release. This point, therefore, is obviously dependent on the speed of the plane, and its altitude.

While the flyer then continues this flight of approach to the actual object he advisably checks once more the horizontal stabilization of the entire device, as shown by the bubble levels 21, 22 and the adjustment about the vertical axis 7 to compensate for lateral air drift. He also during this time will start the preparatory operations preceding the actual release manipulations for the bomb. The flight is continued until the object to be bombed enters the sighting line 24, 37 at which instant the operation of the camera is started. This production of photographic records now can take place without the finger 133 appearing in the pictures, since the stop watch is not operated. When the object appears in the sighting line 24, 36, the bomb must be released. If all of the tests and adjustments have been carried out properly, the bomb actually must strike the object.

After release of the bomb, the flyer quickly aims the camera at the object to photograph the bomb at the instant of its striking the object.

The recording device furnishes indisputable evidence showing whether the airplane was in horizontal position, whether the instrument was reset from first elevation to vertical alinement of the sights, was set to proper new elevation in accordance with the speed, whether the direction of flight was correctly maintained, the bomb released at the proper instant and whether the bomb struck the target, or not. The photographic record of the setting of indicator 78 on scales 13', 14', 15' clearly shows whether the right values had been correlated. The record of the test flight is clearly distinguished from that of the bombing flight, and the instant of bomb release again is indicated by the re-appearance of finger 130 in picture 93. Obviously the camera also can be reset vertically immediately after release of the bomb to photograph the effect of the projectile.

The entire device may be located on an airplane in any suitable position where inspection of the ground area is feasible. By way of example, the location of the entire device on an airplane is indicated in Figs. 24 and 25.

In these figures the airplane is shown as having a body 200 provided with wings 201 and a cockpit 202. The landing gear 203 is shown withdrawn as for flight, and a propeller 204 is located at the nose of the airplane, and is actuated by any engine, not shown. The entire device forming the subject matter of the present invention, is shown as being disposed adjacent the nose of the body and laterally of the axis of the body which permits the observer to be stationed near the front end of the airplane in the interior of the same so as not to interfere with the observations of the pilot and the cockpit. From Fig. 24, it will also be apparent that the bottom part of the body is provided with an opening 210 through which the observer may sight the selected ground areas and through which also the motion picture camera may photograph the sighted portion or the portions which form the target.

I claim:

1. In a device of the character described, the combination of an instrument unit, an aerial camera, sighting elements on the instrument unit selectively adjustable by the operator to sight a selected target, level elements on the instrument unit variable in accordance with the flight conditions, a plurality of means for indicating to the operator the positions of said elements, replicas of said indicating means, non-accessible to the operator and mean for projecting pictures of said replicas into the aerial camera, whereby the latter is adapted to photograph simultaneously the ground areas over which the airplane flies and the relative positions of said elements.

2. In a device of the character described, the combination of an aerial camera movably mounted on the airplane, a photographic film, means for moving said film in a predetermined plane relatively to the camera, target sighting elements selectively adjustable by the operator, means for indicating the positions of said elements, replicas of said indicating means non-accessible to the operator, but variable in accordance with the adjustments of said elements, and projecting means interposed between the replicas and the camera, said projecting means being disposed to maintain uniform relation of the replicas to the plane of the film in the camera regardless of the relation of the camera to the sighting elements whereby the camera produces photographs of ground areas over which the airplane flies coincidentally with the production of photographs of the means indicating the position to which the sighting elements were adjusted.

3. In a device of the character described, the combination of an aerial motion picture camera movable relatively to the airplane and adapted to photograph ground areas during flight, target sighting elements selectively adjustable by the operator, means for indicating the positions to which said sighting elements are adjusted, replicas of said indicating means, and means interposed between the replicas and the camera for projecting pictures of the replicas on the film of the camera, in uniform relation to the pictures of the ground area portions produced by the camera regardless of the position of the camera relatively to the target sighting elements whereby the camera produces photographs of ground areas over which the airplane flies coincidentally with the production of photographs of the replicas indicating the position to which the sighting elements were adjusted.

4. In a device of the character described, the combination of an instrument unit, an aerial camera adjustable relatively thereto, level elements on the instrument unit variable in accordance with flight conditions, replicas of said elements, a self-contained support holding said replicas, in a fixed position relatively thereto, and means for photographically recording the replicas in the camera regardless of the position of the camera relatively to the instrument unit whereby the camera is adapted to record the flight conditions, as represented by the level elements together with the pictures of the ground areas over which the airplane flies.

5. In a device of the character described, the combination of an instrument unit, camera movable relatively thereto, altitude, and angle indicating elements on the instrument unit accessible to observation by the operator, replicas of said elements in fixed relation to the instrument unit and inaccessible to observation by the operator, a timepiece inaccessible to the operator, means for projecting pictures of said replicas and timepiece into the camera, at any position thereof relatively to the instrument unit, whereby the camera is adapted to record the flight conditions represented by the indicating elements, the time and the areas over which the airplane flies at the indicated time under the indicated flight conditions.

6. In a device of the character described, the combination of an instrument unit, aerial camera movable relatively thereto, altitude and angle indicating elements on the instrument unit variable in accordance with flight conditions, replicas of said elements, said replicas being assembled in a self-contained structure, a timepiece supported in said self-contained structure, means for fixedly but removably mounting said self-contained structure on the instrument unit and for connecting it with the camera, and means for producing pictures of the replicas and timepiece in said self-contained structure in the camera regardless of its relation to the instrument unit whereby the camera is adapted to produce pictures of the ground areas over which the airplane flies together with pictures of the timepiece and altitude and angle indicating elements.

7. In a device of the character described, the combination of an instrument unit, an aerial camera movable relatively thereto, indicating elements on the instrument unit selectively adjustable by the operator, said indicating elements being constantly accessible to the operator for actuation and observation, a closed housing fixedly connected with the instrument unit, replicas of said indicating elements fixedly located in the housing, means on the camera for supporting it movably on said housing, and means supported by the movable camera for projecting pictures of the replicas fixedly located in the housing into the camera whereby the camera produces pictures of said operator controlled indicating elements coincidentally with pictures of the ground area over which the airplane flies.

8. In a device of the character described, the combination of an instrument unit, an aerial camera movable relatively thereto, a scale carrier with gradations fixed on the instrument unit, an indicator carriage selectively movable by the operator relatively to the scale carrier, a replica of the scale carrier in fixed relation thereto, an indicating element for the replica, said replica and indicating element being relatively movable and being in fixed relation to said relatively movable scale carrier and carriage respectively, means for operatively connecting the indicator carriage with the camera, whereby simultaneously the latter is moved upon movement of the indicator carriage and relative movement of said scale replica and its indicating element is produced, and means for projecting pictures of said replica and indicating element at any relative adjustment thereof into the camera at any position of the latter relatively to the instrument unit whereby the camera produces pictures of the ground areas over which the airplane flies and of the scale gradations and selectively adjusted indicator.

9. In a device of the character described, the combination of an instrument unit fixed to an aerial vehicle, an aerial camera unit movable relatively thereto, a carrier for a plurality of scales exchangeably fixed on the instrument unit, an indicator carriage selectively movable by the operator relatively to the scale carrier and scales thereon, a replica of the exchangeable scale carrier and likewise exchangeably connected with the instrument unit, an indicating element for the replica, said replica and the pertaining indicating element being relatively movable and being fixed to said relatively movable units respectively, means for operatively connecting the indicator carriage with the camera unit, whereby the latter is moved upon movement of the carriage, and relative movement of said scale replica and its indicating element is produced, and means for projecting pictures of said replica and indicating element during flight of the vehicle at any relative adjustment of said replica and indicating element into the camera unit at any position of the latter relatively to the instrument unit whereby the camera furnishes pictures of the ground areas over which the airplane flies together with pictures of said replicas and pertaining indicating elements.

10. In a device of the character described, the combination of an instrument unit fixed to an aerial vehicle, an aerial camera movable relatively thereto, a carrier for a plurality of scales mounted on the instrument unit, an indicator carriage selectively adjustable by the operator relatively to the scale carrier, indicator elements in cooperation with said scales fixed on said carriage, a sighting member fixed to the carriage, a companion sighting member immovable on the instrument unit, the angular relation of said sighting members being represented by the relation of at least one indicator element to its pertaining scale, a housing fixed to the instrument unit, means for pivotally supporting the camera from the housing replicas of the scales within said housing and fixedly connected to the instrument unit, replicas of the indicators within the housing and fixed to the camera, means for turning the camera on its pivotal support upon adjustment of the movable sight member relatively to the stationary sight member, and means for projecting pictures from the replicas of the scales and pertaining indicators into the camera at any relative position of said replicas and units whereby the camera furnishes pictures of the ground areas over which the airplane flies together with indications of the positions to which the sighting members have been adjusted.

11. In a device of the character described, the combination of an instrument unit, fixed to an aerial vehicle, a camera unit, target sighting means on the instrument unit, means for successively setting during the flight the target sighting means to different relative positions, means for indicating the angular relation of the sighting means, means for projecting indications derived from said indicating means into the camera, and means for applying a distinguishing mark to the photographs of indications of one of two successive settings of the sight members whereby the photographs produced by the camera indicate the sequence in which the photographs have been produced.

12. In a device of the character described, the combination of an instrument unit fixed to an aerial vehicle, a recording unit, target sighting means on the instrument unit, means under control of the operator for successively setting the target sighting means to different relative positions, means for indicating the angular relation of the sighting means, means for projecting indications derived from said indicating means into the recording unit, and means for applying a distinguishing mark to the record of indications of one of two successive settings of the targets sighting members, said means for applying the distinguishing mark being under control of the operator whereby the records produced by the recording unit indicate the angular relation of the sighting means and the sequence in which the angular adjustments were produced.

13. In a device of the character described, the combination of an instrument unit fixed to an aerial vehicle, an aerial camera, target sighting means on the instrument unit, means on the instrument unit for successively setting the target sighting means to different relative positions, means for indicating the angular relation of the sighting means, a movable marking element, means for projecting indications derived from said indicating means into the camera, and means for projecting said marking element to recording position to produce in the photographs made by the camera a mark adapted to distinguish the record of the respective setting of the sighting members from the record of another setting of the sighting members during which the marking element was not projected, said projecting means for the movable marking element being under control of the operator whereby said aerial camera produces pictures of the ground areas over which the airplane flies, together with pictures of the indications for the target sighting elements and pictures of the projected means indicating the sequence of the setting of the target sighting means.

14. In a device of the character described, the combination of an instrument unit fixed to an aerial vehicle, an aerial camera, a sighting member movable on the instrument unit, a companion sighting member fixed on the instrument unit, an altitude indicating scale on the instrument unit, means for setting the movable sighting member selectively to any altitude indication on the scale and for establishing a predetermined angle of elevation between the sighting members, an elevation indicating scale united with said altitude scale, means on the movable sight member for indicating on the elevation scale the elevation to which the sight members were set by movement of the movable sight member, means for producing in the recording unit a record of said indicated altitude and elevation, and means for simultaneously producing during flight in the camera a picture of the territory covered by the flight of the vehicle whereby the photographs produced in the camera indicate the setting of the sighting members coincidentally with the ground area over which the airplane flies.

15. In a device of the character described, the combination of an instrument unit attached to an aerial vehicle, an aerial camera, a sighting member movable on the instrument unit, a companion sighting member fixed on the instrument unit, an altitude indicating scale fixed on the instrument unit, means for successively setting the movable sighting member selectively to different indications on the scale to establish thereby different elevations successively between the sighting members, a movable marking element, means for producing in the camera a photograph of the successive settings of the sighting member on said scale, and means for projecting said marking element to recording position for producing in the photograph a mark adapted to distinguish the record of one setting of the movable sighting member from another record of the same setting of the sighting member, said projecting means for the marking element being under control of the operator.

16. In a device of the character described, the combination of an instrument unit fixedly attached to an aerial vehicle, an aerial motion picture camera, a sighting member movable on the instrument unit, a companion sighting member fixed on the instrument unit, an altitude indicating scale on the instrument unit, means for setting the movable sighting member selectively to any altitude indication on the scale and for establishing thereby a predetermined elevation between the sighting members, means for indicating the time instant at which a ground object selected by the operator enters the elevational line of sight established by the sight members, means for moving the sight members to vertical alinement, means for indicating the time instant at which the said object enters the vertical line of sight established by the sight members upon vertical alinement, means for photographing in the camera the scale indications to which the movable sight member has successively been set, the time indicating means showing the time elapsed between said instants, and the territory covered by the flight of the vehicle in said period of time.

17. In a device of the character described, the combination of an instrument unit fixedly attached to an aerial vehicle, an aerial camera, a sighting member movable on the instrument unit, a companion sighting member immovable on the instrument unit, an altitude indicating scale on the instrument unit, means for setting the movable sighting member selectively to any altitude indication on the scale and for establishing a predetermined elevation between the sighting members, an elevation indicating scale fixed to said altitude scale, the movable sight member being movable on the elevation scale to a selected value, means for indicating the time instant at which a ground object selected by the operator enters the elevational line of sight established by the sight members, means for moving the sight members to vertical alinement, means for indicating the instant of time at which the said ground object enters the vertical line of sight established by the sight members upon vertical alinement, whereby the period elapsed between said instants furnishes an indication of the speed of the airplane, a movable marking element, means for producing in the camera a picture of the territory covered by the flight in said period between the two instants, means for photographing in the camera the elevation indications to which the movable sight member has been set, means for photographing in said camera the time indicating means, and means under control of said time indicating means for projecting the marking element to a position in which it is photographed together with said indications and the ground areas over which the airplane flies.

18. In a device of the character described, the combination of an aerial camera, a pair of target sighting members relatively adjustable by the flyer to different elevations, means for indicating the elevations to which said sighting members have been set, a movable marking element, means in the camera for photographing simultaneously with the indications of the elevations of said sight members the territory covered by the flight of the vehicle between successive settings of said sight members, a stop watch, an electromagnet, a circuit for said electromagnet adapted to be closed upon the starting of said stop watch and to be opened upon stoppage of the same, a movable marking element operatively connected with said electromagnet for projection to a position in which it is being photographed by the camera upon energization of said electromagnet and for withdrawal from recording position upon deenergization of said electromagnet whereby the camera produces pictures of the ground areas together with setting of the sight members and together with the marking element and without the latter respectively, dependent upon operation of the stop watch.

19. In a device of the character described, the combination of an instrument unit mounted on an aerial vehicle, sighting members on said unit movable to selectively determined elevations and to vertical alinement, means for determining the time elapsed between the instant at which an object on the ground selected by the operator enters the line of vision established by a selected elevation of the sight members, and the instant at which in continuation of the flight of the vehicle, the same object is in alinement with the vertically alined sight members to permit thereby the speed of the vehicle to be determined, a time scale, means for setting one of the sight members in accordance with the value of the time elapsed between said instants on said time scale, an aerial camera movably connected with the instrument unit, means in said instrument unit and camera for photographing indications of the relations of said sight members to each other at the different settings, for photographing the time indications and for producing pictures of the territory covered by the flight between said instants of time, and means for actuating in the camera a movable element adapted to produce a mark for distinguishing the photographs of one setting of the sighting members from the photographs of a similar setting.

20. In a device of the character described, the combination of an instrument unit mounted on an aerial vehicle, an aerial camera movably connected with the instrument unit, adjustable means on the instrument unit for sighting an object different from the target object on the ground, means in the camera for photographing indications for the sighting means the sighted object and the surrounding ground area during flight, means for measuring the time elapsed between the appearance of the sighted object in the line of sight and the position of the aerial vehicle directly above the sighted object, means for establishing a new line of sight in accordance with the time measured, and means for releasing a bomb from the vehicle, when the target to be bombed appears in said new line of sight, means in the camera for photographing the second indications of the new line of sight the time measuring means, and the object target to be bombed, and means for producing in the photographic record a mark differentiating between the two photographs produced.

21. In a device of the character described, the combination of an instrument unit mounted on an aerial vehicle, an aerial camera movably connected with the instrument unit, adjustable means on the instrument unit for sighting an object different from the object to be bombed on the ground, means in camera for photographing the said different object selected, the surrounding ground area and indications of the said sighting means during a flight of the vehicle, means for measuring the time elapsed between the appearance of said different object in the line of sight and the position of the vehicle directly above the said different object, means for producing in the camera a record of the said time elapsed, means for adjusting the sighting means in accordance with the time measured by said time measuring means to establish a new line of sight, means for releasing a bomb from the vehicle when the target object to be bombed appears in said new line of sight while the vehicle is in flight, means in the camera for photographing the target object to be bombed and the surrounding ground during said continuation of the flight, and for simultaneously photographing the indication of the new line of sight and the time indication of the time of the release of the bomb.

22. In a device of the character described, the combination of an instrument unit mounted on an aerial vehicle, an aerial camera movably connected with the instrument unit, adjustable means on the instrument unit for sighting an auxiliary object on the ground, means in the camera for photographing the auxiliary object and surrounding ground area, an indication of the adjustment of said sighting means during the approach flight to the auxiliary object, means for measuring the time elapsed between the appearance of the auxiliary object in the said line of sight and the arrival of the vehicle directly above the auxiliary object, means for adjusting the sighting means in accordance with the time measured to establish a new line of sight, means for releasing a bomb from the vehicle when the target object to be bombed appears in said new line of sight during the continuation of the flight, means in the camera for photographing during continued flight the target object to be bombed and the indication of the second adjustment of the sighting means to the new line of sight and time indications, and means under control of said time measuring means for producing in the photographs a mark differentiating between the photographs of the approach flight and those of the continued flight.

23. In combination with an aerial motion picture camera, means for producing successive series of pictures of ground area sections, and means for simultaneously photographing with some of said series a marking element adapted to differentiate said series from other series independently of the difference in the object photographed.

24. In a device of the character described, the combination of level instruments, relatively adjustable sight members, an altitude scale, means for setting a sight member to a selectively determined value of the altitude scale, a time scale, means for setting the same sight member to an experimentally determined value of the time scale, an aerial camera movably connected with the sight member settable to said values, a replica housing between said units, replicas of said level instruments and scales within the housing, a timepiece in the housing, means connected with the movable camera for indicating on the scale replicas in the housing the values to which the sight member was successively adjusted, and means for photographing in the camera within a single image frame a ground area section determined by the setting of the camera, the replicas of said levels, said scales and scale indications, the timepiece, and an element producing in the photographic record a mark differentiating the photograph made during the setting of the sight member to the altitude scale from the photograph made from the experimentally determined setting of the sight member to the time scale whereby the photographs furnish records of the conditions of flight with respect to different ground areas at the indicated times and of the adjustments of the sighting member.

25. In a device of the character described, the combination of an instrument unit fixed to an aerial vehicle, an altitude scale on said unit, a sight member movable relatively to the altitude scale and settable to sight objects on the ground, a time scale in fixed relation to said altitude scale, means for setting said sight member to a value on said time scale determined from a speed determination obtained from the setting of the sight member on the altitude scale, an aerial camera movably connected with said sight member and connected with the instrument unit, replicas of said scales fixed on the plane, indicating means fixed to the movable camera and movable relatively to said replicas in accordance with the setting of the sight member to the scales, means in the camera for producing photographs of ground objects to which the sight member has been set, and photographs of the scale replicas and indications, and means in the camera for producing a mark adapted to differentiate the photographs made upon altitude setting of the sight member from the photographs made upon time value setting of the sight member.

26. In a device of the character described, the combination of a frame mounted for universal movement on the airplane, a plurality of scale members in fixed relationship to each other and exchangeably supported on the frame, a carriage slidable on the frame, a sight member fixed to the carriage, a plurality of indicators mounted for cooperation with the several scale members on the carriage, a companion sight member fixedly mounted on the frame, a horizontal and a longitudinal level on the carriage adapted to indicate horizontal and longitudinal inclination respectively of the airplane, a housing fixedly connected with said frame, replicas of said levels fixed within the housing, a carrier for said replicas of the levels, a time indicating element connected with said carrier, means in the housing for removably supporting said carrier in fixed relation to said frame, the replicas of said scales being fixedly supported in said housing independently of said carrier, a recording unit operatively connected with the carriage and pivotally supported on said housing, an indicator element within said housing and movable upon movement of said camera relatively to the replica of the scales within said housing, means in the camera for photographing ground sections determined by the setting of the sight member on the frame, and means in the camera for photographing the replicas of said level instruments, said time measuring means, the scale replicas, and the indicating means associated with said scale replicas.

27. In a device of the character described, the combination of an instrument unit, an aerial camera movably connected therewith, means in the camera for photographing selectively determind sections of the ground successively during the flight of the aerial vehicle, a marking element, and means for selectively photographing simultaneously with predetermined operations of photographing ground sections said marking element in overlapping relation with respect to the picture of the ground section photographed by the camera.

28. In a device for testing and recording the marksmanship of a bomber on a flying airplane, comprising in combination sighting elements on the airplane selectively adjustable by the bomber to sight the target, level elements variable in accordance with the conditions of flight independent of the bomber, means for indicating the adjustments and variations respectively of said elements, and means for differentially recording the positions of said indicating means during flight at the time of sighting the target and release of the bomb.

29. In a device for testing and recording the marksmanship of a bomber on a flying airplane, the combination of an instrument unit, sighting elements on the instrument unit selectively adjustable by the operator for sighting a selected target on the ground, timing elements, indicating means for said sighting and timing elements, replicas of said indicating means adapted to show their relative positions, means for photographing the relative positions of said elements from the replicas and for simultaneously photographing ground areas over which the airplane flies, whereby the relation of sighting and timing elements at the time the airplane flies over a certain area is recorded.

30. In a device for testing the marksmanship of a bomber on a flying airplane, the combination of an instrument unit movable on the airplane, an aerial camera movable on the airplane relatively to the instrument unit, target sighting means on the instrument unit selectively adjustable by the operator, elements indicating the relation of said sighting means to said instrument unit, replicas of said indicating elements in fixed relation thereto, means for moving the camera simultaneously with the instrument unit, means for projecting pictures of said replicas into the camera at any position of the camera and instrument unit, and means in the camera for photographing said replicas coincidentally with the ground areas over which the airplane flies.

31. In a device of the character described, the combination of an airplane, sighting elements, an instrument unit on the airplane, and on which said sighting elements are mounted, said sighting elements being selectively adjustable to sight a target on the ground, level elements in a location visible to the operator but variable in accordance with flight conditions independently of the operator, indicating means on said level elements, replicas of said indicating means and level elements, which replicas are inaccessible to the operator, an aerial camera movable relatively to said replicas, and means for photographing the replicas, showing the relation of the level elements and their indicating means, together with the ground area photographed by the camera.

32. In a device of the character described, the combination of an airplane, an aerial camera on the airplane, adjustable means on the airplane for sighting an object different from the target object on the ground, means in the camera for photographing said object and surrounding ground area, means on the airplane for indicating the adjustment of the sighting means, means in the camera for photographing the indication of the adjustment during the approach flight of the airplane to said object different from the target object, means for measuring the time elapsed between the appearance of said object in the line of sight, and the arrival of the vehicle directly above said object to determine the speed of the airplane, means for adjusting the sighting means in accordance with the speed determined to establish a new line of sight, means for releasing a bomb from the airplane when the target object appears in the newly established line of sight, while the airplane continues its flight at the same speed and altitude, means in the camera for photographing during the continuation of flight of the airplane, said target object and the indication of the second adjustment of the sighting means, means under control of said time measuring means for producing in the photograph a mark differentiating between the photographs made in the approach flight and the photographs made during the continuation flight respectively, and for photographing the indication of the time measuring means and the time of the release of the bomb.

HEINZ KUPPENBENDER.